(12) United States Patent
Wilson et al.

(10) Patent No.: US 11,119,242 B2
(45) Date of Patent: Sep. 14, 2021

(54) ACTIVE NOISE CANCELLATION IN ELECTROMAGNETIC TELEMETRY

(71) Applicant: Halliburton Energy Services, Inc., Houston, TX (US)

(72) Inventors: Glenn Andrew Wilson, Houston, TX (US); Etienne M. Samson, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 46 days.

(21) Appl. No.: 16/488,073

(22) PCT Filed: Mar. 24, 2017

(86) PCT No.: PCT/US2017/024097
§ 371 (c)(1),
(2) Date: Aug. 22, 2019

(87) PCT Pub. No.: WO2018/174900
PCT Pub. Date: Sep. 27, 2018

(65) Prior Publication Data
US 2020/0012009 A1  Jan. 9, 2020

(51) Int. Cl.
*G01V 3/38* (2006.01)
*G01V 3/30* (2006.01)
*E21B 47/13* (2012.01)

(52) U.S. Cl.
CPC ............... *G01V 3/38* (2013.01); *E21B 47/13* (2020.05); *G01V 3/30* (2013.01)

(58) Field of Classification Search
CPC ... G01V 3/38; G01V 3/30; G01V 3/00; E21B 47/13; E21B 47/12; E21B 47/00
See application file for complete search history.

(56) References Cited

U.S. PATENT DOCUMENTS

| 4,980,682 A | 12/1990 | Klein et al. |
| 6,657,597 B2 | 12/2003 | Rodney et al. |

(Continued)

FOREIGN PATENT DOCUMENTS

| RU | 2419820 C2 | 5/2011 |
| WO | 2011072135 A1 | 6/2011 |

(Continued)

OTHER PUBLICATIONS

Russian Search Report with Translation for Application No. 2019126015 dated Apr. 8, 2020.

(Continued)

*Primary Examiner* — Mohamed Charioui
(74) *Attorney, Agent, or Firm* — Benjamin Ford; C. Tumey Law Group PLLC (57) ABSTRACT

Systems and methods for noise cancellation in electromagnetic telemetry systems. A method for noise cancellation in electromagnetic telemetry may include: disposing an electromagnetic tool in a lateral section of a wellbore, wherein the electromagnetic tool comprises a transmitter; positioning a first counter electrode at a surface of the Earth; positioning a second counter electrode at the surface on an opposite side of the wellbore from the lateral section; transmitting a signal from the electromagnetic tool; measuring a first electromagnetic field property using the first counter electrode to obtain a received voltage; measuring a second electromagnetic field property using the second counter electrode to obtain a noise voltage; and removing noise from received voltage using the noise voltage.

20 Claims, 6 Drawing Sheets

(56) References Cited

U.S. PATENT DOCUMENTS

| | | | |
|---|---|---|---|
| 6,801,136 B1 | 10/2004 | Goodman et al. | |
| 7,243,028 B2 | 7/2007 | Young et al. | |
| 2002/0180613 A1* | 12/2002 | Shi | E21B 47/18 340/853.1 |
| 2003/0025639 A1* | 2/2003 | Rodney | E21B 47/13 343/719 |
| 2004/0069514 A1 | 4/2004 | Rodney et al. | |
| 2006/0035591 A1* | 2/2006 | Young | E21B 47/13 455/63.1 |
| 2010/0259267 A1 | 10/2010 | Rosthal et al. | |
| 2010/0314169 A1* | 12/2010 | Jarrot | E21B 47/13 175/48 |
| 2015/0061683 A1 | 3/2015 | Marsala et al. | |
| 2017/0131427 A1* | 5/2017 | Kirchmeier | E21B 10/00 |
| 2017/0227667 A1* | 8/2017 | DePavia | G01V 3/18 |
| 2018/0135408 A1* | 5/2018 | Cooley | E21B 41/0085 |

FOREIGN PATENT DOCUMENTS

| | | | | |
|---|---|---|---|---|
| WO | 2016100736 A1 | 6/2016 | | |
| WO | WO-2016100736 A1 * | 6/2016 | | E21B 17/023 |
| WO | 2016196246 A1 | 8/2016 | | |
| WO | 2017024082 | 2/2017 | | |

OTHER PUBLICATIONS

ISRWO International Search Report and Written Opinion for PCT/US2017/024097 dated Nov. 15, 2017.
Canadian Search Report and Written Opinion for Application No. 3053764 dated May 14, 2021.

* cited by examiner

ACTIVE NOISE CANCELLATION IN ELECTROMAGNETIC TELEMETRY

BACKGROUND

Electromagnetic ("EM") telemetry systems may be utilized to transmit data from a wellbore to surface equipment. A typical telemetry system utilizing electromagnetic techniques may include a transmitter positioned in the wellbore and a receiver located at the surface. However, ambient noises, such as, for example, telluric noise and manmade noise from power lines and on-site machinery may degrade the efficiency of typical electromagnetic telemetry systems.

The quality of an electromagnetic signal reaching the surface may be measured in terms of a signal-to-noise ratio ("SNR"). As the SNR decreases, it may become more difficult to recover and/or reconstruct a signal. Therefore, it may be desirable to reduce noise in EM telemetry systems.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to systems and methods for noise cancellation in EM telemetry during logging, drilling, measurement-while-drilling ("MWD"), and logging-while-drilling ("LWD") operations. This disclosure may specifically relate to systems and methods for improving SNR of EM telemetry data.

EM telemetry may be a technique for communicating from the bottom hole assembly ("BHA") to the surface, such that drilling dynamics data may allow for faster drilling, while formation evaluation (e.g., MWD and LWD) data may allow for accurate well placement ("geosteering") to maximize reservoir value.

Figure 1:
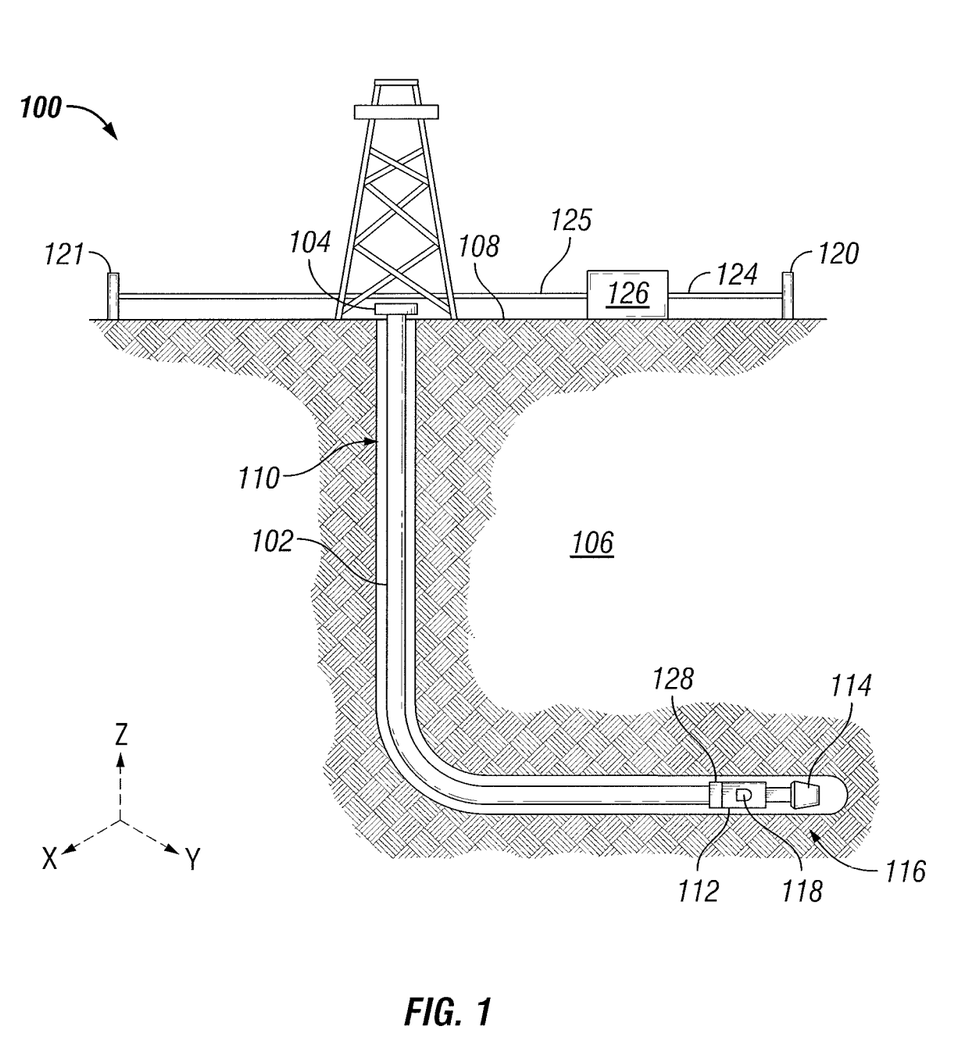
FIG. 1 is a schematic illustration of an example of an electromagnetic telemetry system.

FIG. 1 is a schematic illustration of an EM telemetry system 100 (e.g., a bidirectional EM telemetry system). Wellbore 102 may extend from a wellhead 104 that extends into subterranean formation 106 from surface 108. Generally, wellbore 102 may include horizontal, vertical, slanted, curved, and other types of wellbore geometries and orientations. Additionally, while EM telemetry system 100 is illustrated as being land-based, it should be understood that the present techniques may also be applicable in offshore applications. Wellbore 102 may be cased or uncased. In examples, a conveyance 110 may begin at wellhead 104 and traverse wellbore 102. Conveyance 110 may include wireline, slickline, coiled tubing, pipe, drill pipe, downhole tractor, or the like, which may provide mechanical suspension, for electromagnetic tool 112. Conveyance 110 may also provide as well electrical connectivity in some instances to electromagnetic tool 112. As illustrated, conveyance 110 may be in the form of drill pipe. A drill bit 114 may be attached to a distal end of conveyance 110 and may be driven, for example, either by a downhole motor and/or via rotation of conveyance 110 from surface 108. Drill bit 114 may be a part of BHA 116 at distal end of conveyance 110. While not illustrated, BHA 116 may further include one or more of a mud motor, power module, steering module, telemetry subassembly, and/or other sensors and instrumentation as will be appreciated by those of ordinary skill in the art. BHA 116 may be an MWD or LWD system.

EM telemetry system 100 may include an electromagnetic tool 112. Electromagnetic tool 112 may be a part of BHA 116. Electromagnetic tool 112 may include at least one transmitter 118. It should be noted that electromagnetic tool 112 may include a plurality of transmitters 118. At least one transmitter 118 may be disposed along a longitudinal axis of electromagnetic tool 112. Transmitter 118 may include a voltage source and may apply a voltage across electromagnetic tool 112, e.g., across a gap sub (not shown) disposed in BHA 116. Transmitter 118 may include gap sub, band gap, toroids, or solenoid antennae, among others. Transmitter 118 may transmit a signal at frequencies between about 1 Hz and about 100 Hz, with data rates nominally between about 1 bits per second ("bps") and about 100 bps.

Figure 7:
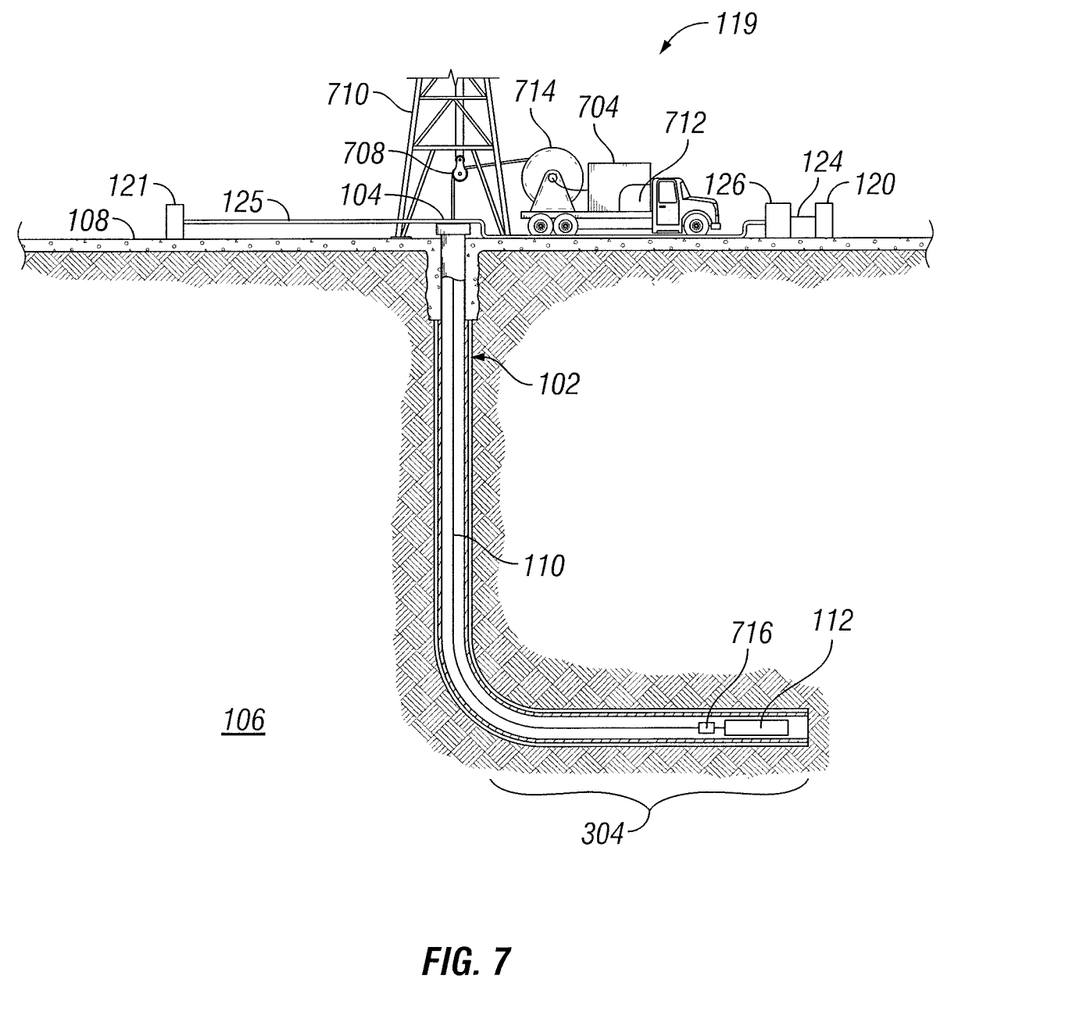
FIG. 7 is a schematic illustration of an example of a wireline environment.

It should be noted that although FIG. 1 illustrates electromagnetic tool 112 as a measurement-while-drilling tool or logging-while-drilling tool, electromagnetic tool 112 may also be utilized on a conveyance, such as, a wireline (shown on FIG.7).

Figure 3:
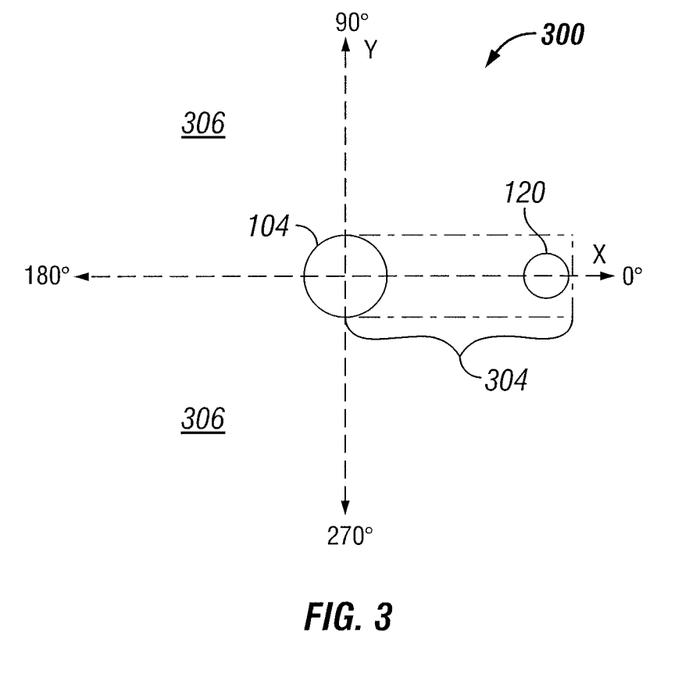
FIG. 3 is an aerial view of the electromagnetic telemetry system shown on FIGS. 2A and 2B.

EM telemetry system 100 may also include first counter electrode 120 and second counter electrode 121. Non-limiting examples of suitable electrodes for first counter electrode 120 and second counter electrode 121 may include a capacitive electrode, a galvanic electrode, or a combination thereof. First counter electrode 120 and second counter electrode 121 may be receivers. First counter electrode 120 and second counter electrode 121 may each be used for voltage measurements, e.g., measurement of voltage between first counter electrode 120 and wellhead 104 and between second counter electrode 121 and wellhead 104. As will be described in more detail below, second counter electrode 121 may be placed in a null zone (e.g., null zone 306 on FIG. 3) such that second counter electrode 121 may measure a voltage signal correlated with noise. Accordingly, the voltage measured at second counter electrode 121 may be used for noise cancellation in the measurements at first counter electrode 120, which may include both noise and signals from transmitter 118.

Systems and methods of the present disclosure may be implemented, at least in part, with an information handling system 126 which may be located at the surface 108 and/or downhole information handling system 128 which may be located on electromagnetic tool 112. Information handling system 126 and/or downhole information handling system 128 may determine (e.g., measure or calculate) values, such as, for example, voltage, noise, and/or a signal received at a surface-deployed counter electrode (e.g., first counter electrode 120 and second counter electrode 121). Information handling system 126 may process signals (e.g., information) received at a counter electrode (e.g., first counter electrodes 120 and second counter electrode 121) via a communication link (e.g., communication links 124 and 125). Electromagnetic tool 112 may be connected to and/or controlled by information handling system 126 and/or downhole information handling system 128. Transmission of electric fields (e.g., signals) by a transmitter 118 and the recordation of information, such as, for example, voltage, noise, and/or a signal received at counter electrode 120 may be controlled by information handling system 126 and/or downhole information handling system 128. Information handling system 126 may transmit information to electromagnetic tool 112 and may receive as well as process information recorded by electromagnetic tool 112.

Information handling system 126 (e.g., a surface system) may include a keyboard, a mouse, and/or a video display. Information handling system 126 may communicate with electromagnetic tool 112 through a communication link (not shown) which may be disposed in (or on) conveyance 110. Wireless communication may also be used to transmit information back and forth between information handling system 126 and electromagnetic tool 112. While not illustrated, the electromagnetic tool 112 may include one or more additional components, such as analog-to-digital converter, filter and amplifier, among others, that may be used to process the measurements of the electromagnetic tool 112 before they may be transmitted to surface 108. Information raw measurements, data) from electromagnetic tool 112 may be transmitted to surface 108 at frequencies between about 1 Hz and about 15 Hz. Any suitable technique may be used for transmitting a signal from electromagnetic tool 112 to surface 108, including, EM telemetry. Telemetry data may be analyzed and processed by information handling system 126 (e.g., surface system) and/or downhole information handling system 128 (e.g., downhole system).

Both information handling systems (e.g., information handling system 126 and downhole information handling system 128) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Both information handling systems may also include one or more buses operable to transmit communications between the various hardware components. Both information handling systems may include a computer, a network storage device, or any other suitable device and may vary in size, shape, performance, functionality, and price. Both information handling systems may include random access memory (RAM), one or more processing resources such as a central processing unit (CPU) or hardware or software control logic, ROM, and/or other types of nonvolatile memory. Both information handling systems may include a microprocessor or other suitable circuitry, for receiving and processing signals received by the electromagnetic tool 112. Additional components of the information handling systems may include one or more disk drives, one or more network ports for communication with external devices as well as various input and output (I/O) devices.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 2A:
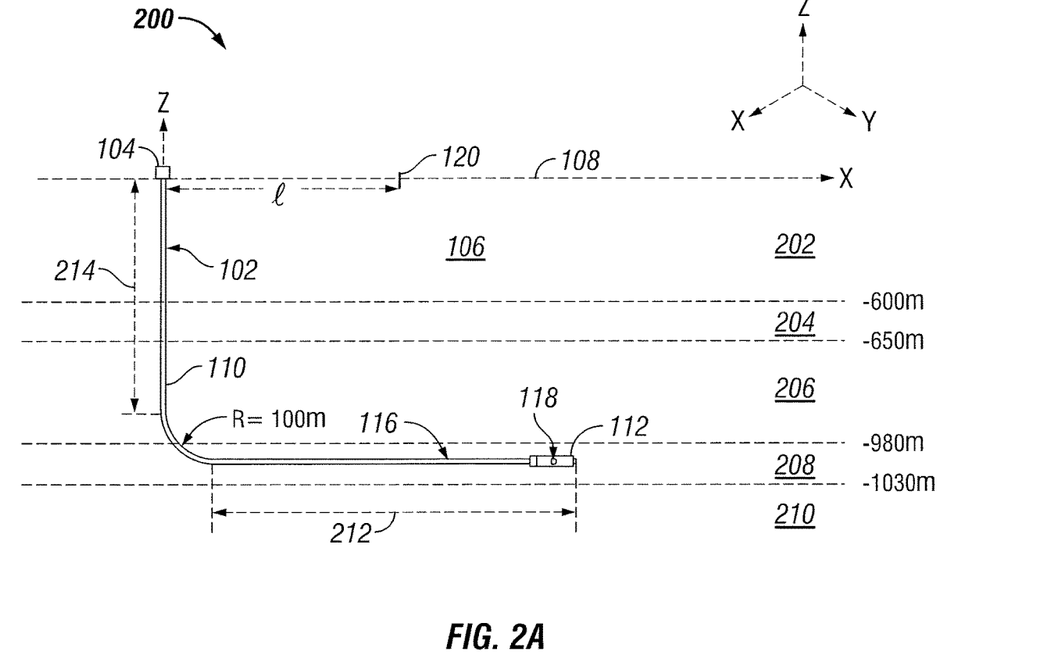
FIG. 2A is another schematic illustration of an example of an electromagnetic telemetry system.

FIG. 2A illustrates another example of an EM telemetry system (e.g., EM telemetry system 200). EM telemetry system 200 may include electromagnetic tool 112 disposed on BHA 116. Electromagnetic tool 112 may be disposed in wellbore 102 on conveyance 110. The electromagnetic tool 112 may include a transmitter 118. At or above surface 108 of the earth, first counter electrode 120 may be deployed. The transmitter 118 may apply a voltage, for example, across a gap-sub in the BHA 116. The applied voltage may be from about 1 V to about 100 V, for example. The first counter electrode 120 deployed at the surface may measure a voltage, for example, between wellhead 104 and first counter electrode 120. First counter electrode 120 may be place at a length l of from about 0 meters to about 500 meters (about 0 ft to about 1640 ft), for example about 250 m (about 820 ft) from wellhead 104.

As illustrated on FIG. 2, subterranean formation 106 may include various formation resistivity based on depth (e.g., measured depth, "MD"). For example, section 202 (e.g., depth from about 0 m to about 600 m (about 0 ft to about 1970 ft)) may have a resistivity of about 1 $\Omega$m to about 5 $\Omega$m; section 204 (e.g., depth from about 600 m to about 650 m (about 1970 ft to about 2132 ft)) may have a resistivity of about 0.1 $\Omega$m to about 1 $\Omega$m; section 206 (e.g., depth of about 650 m to about 980 m (about 2132 ft to about 3215 ft)) may have a resistivity of about 1 $\Omega$m to about 5 $\Omega$m; section 208 (e.g., depth of about 980 m to about 1030 m (about 3215 ft to about 3379 ft)) may have a resistivity of about 50 $\Omega$m to about 100 $\Omega$m; and section 210 (e.g., depth greater than about 1030 m (3379 ft)) may have a resistivity of about 1 $\Omega$m to about 5 $\Omega$m. A horizontal section 212 of the conveyance 110 may be about 500 m to about 1000 m (about 1640 ft to about 3280 ft). A vertical section 214 of the conveyance 110 may be about 500 m to about 1000 m (about 1640 ft to about 3280 ft). It should be understood that these depth ranges and resistivities are merely illustrative and present embodiments may have depth ranges and resistivities that vary from those described herein.

Figure 2B:
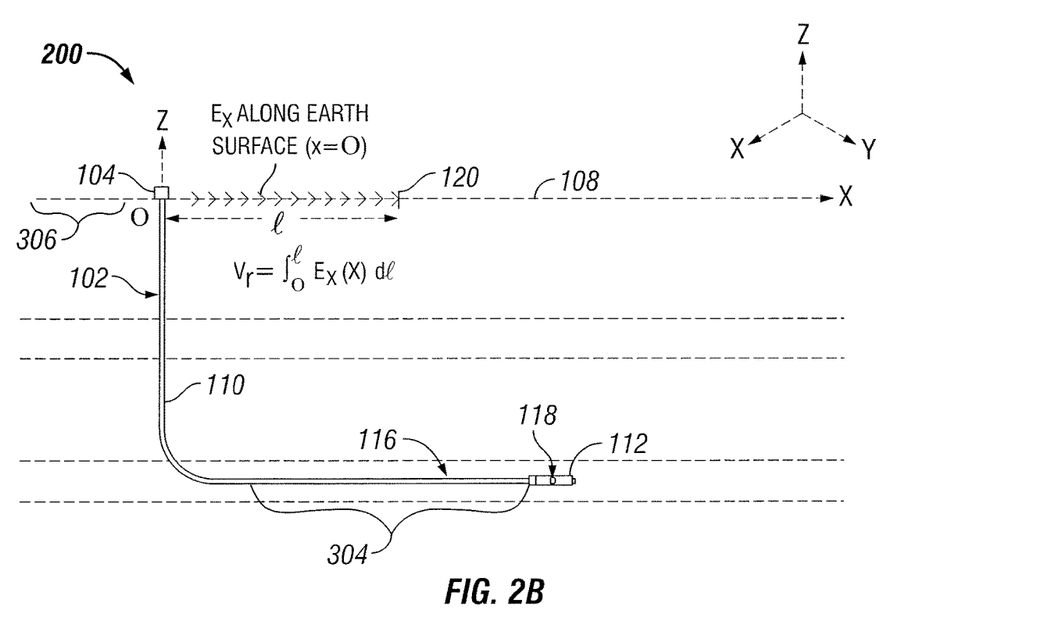
FIG. 2B is another schematic illustration of an example of an electromagnetic telemetry system.

FIG. 2B illustrates calculation of received voltage in EM telemetry system 200. As previously described, transmitter 118 may produce a voltage, for example, from about 1V to about 5V. The voltage may be produced in BHA 116, for example, across a gap sub (not shown) in BHA 116. The first counter electrode 120 deployed at the surface may measure a voltage, for example, between wellhead 104 and first counter electrode 120. As illustrated, the received voltage ($V_r$) may be calculated as the line integral of the electric field at surface 108 between wellhead 104 and first counter electrode 120. The following equation may be used for calculation of the received voltage ($V_r$):

$$V_r = \int_0^l E_x(x) dl \tag{1}$$

wherein $V_r$ may be a received voltage at a counter electrode (e.g., first counter electrode 120), $E_x$ may be an electric field, l may be a distance/length between first counter electrode 120 and wellhead 104, and x may be the lateral distance from the wellhead to the counter electrode.

The recordation, determination and analysis of voltage, signals, and/or noise by a counter electrode (e.g., first counter electrode 120) may be controlled/performed by information handling system 126 and/or downhole information handling system 128 (e.g., shown on FIG. 1). A maximum electric field may be measured at counter electrode 120 above a horizontal section/lateral section (e.g., horizontal section 304) of the wellbore 102. First counter electrode 120 may be placed at the surface 108 above the horizontal section 304 for signal detection from BHA 116 at about 0° from vertical (i.e., directly above horizontal section 304 for maximum signal detection) to about 75° from vertical (i.e., 75° to the right or left from the longitudinal axis of the horizontal section 304).

The horizontal section 304 may extend at an angle from vertical. For example, horizontal section may extend at an angle from about 30° to about 150°, from about 60° to about 120°, of from about 90° relative to vertical. With additional reference to FIG. 3, a minimum electric field (or null zone 306) may be measured on the opposite side of wellhead 104 from horizontal section 304. As used herein, the null zone 306 will be defined as the opposite side of the wellhead 104 from horizontal section 304 and specifically a zone that is about 90° to about 270° (e.g., about) 180° from first counter electrode 120 in the x-y plane at surface 108 (as shown on FIG. 4). In the null zone 306, signal detection from BHA 116 may be minimal at potentially even zero. Because signals from BHA 116 may not be detected (or a minimum amount of signals may be detected) in null zone 306 (e.g., null zone 306 may be a zone where signals are not detected), many of the received signals in null zone 306 may be noise (e.g., drilling rig noise, telluric noise, etc.). Thus, with a direct "high quality" measurement of the noise in the absence of signals from BHA 116, noise rejection/cancellation for signals acquired with the first counter electrode 120 above the horizontal section 304 may be performed, as described in FIGS. 5 and 6. This noise cancellation may occur in real-time. "Real-time" may refer to processing/computing within milliseconds.

Figure 4A:
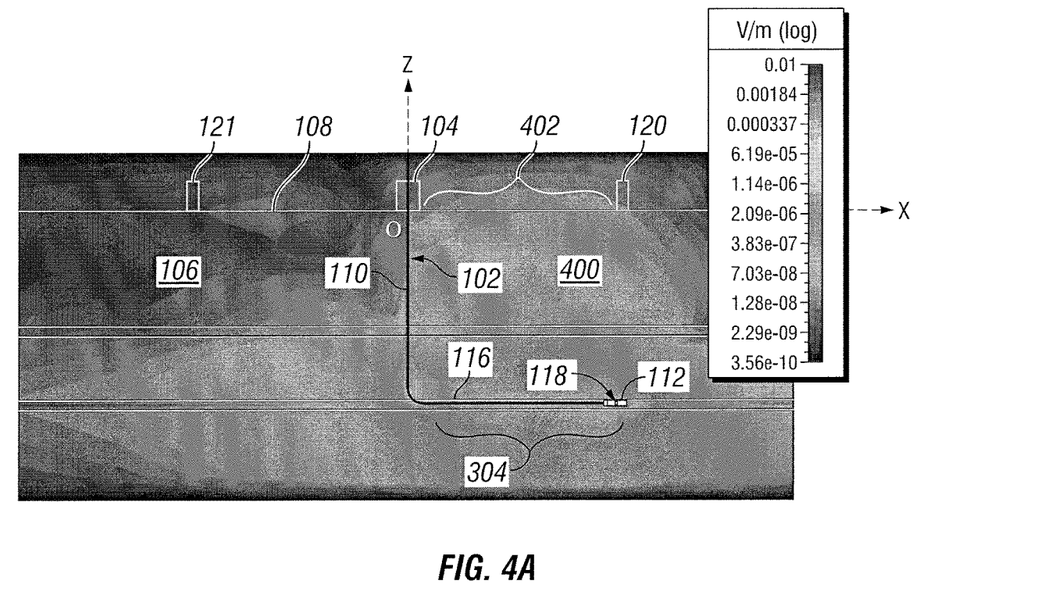
FIGS. 4A and 4B show a distribution of an electric field in the earth while the bottom hole assembly is in a horizontal section of a well.
Figure 4B:
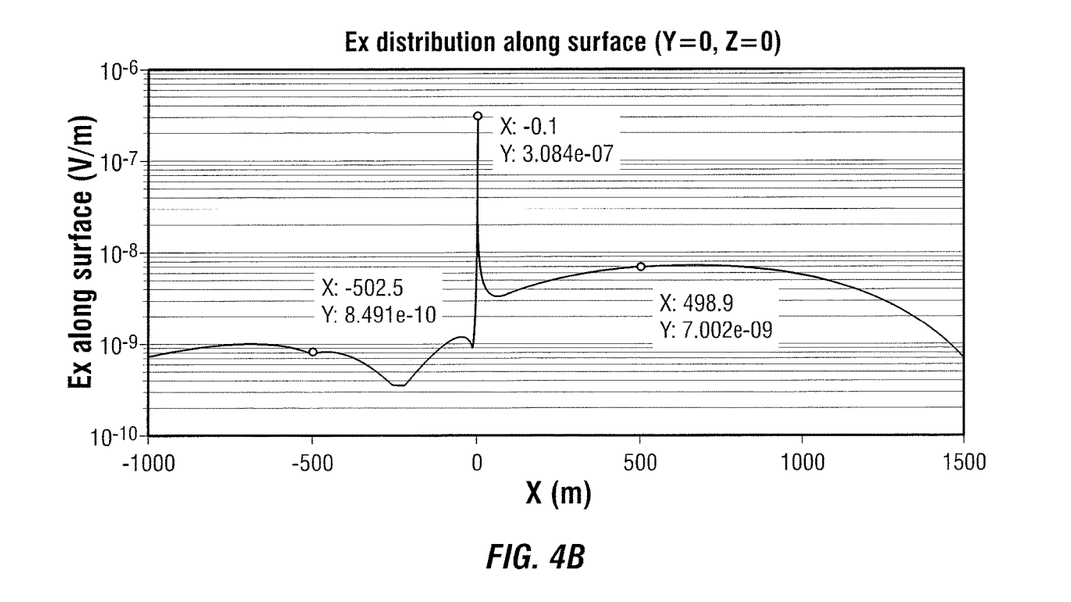

FIGS. 4A and 4B show a distribution of an electric field 400 in the earth while the BHA 116 is in a horizontal section 304 of wellbore 102. The electric field 400 may originate from transmitter 118 and may contact first counter electrode 120 and second counter electrode 121. As illustrated, a maximum may be measured along the side of horizontal section 304, and a minimum electric field may be measured along the opposite side of horizontal section 304 in the null zone 306. A received voltage ($V_r$) may be a line integral 402 of the electric field 400 along the surface 108.

Figure 5:
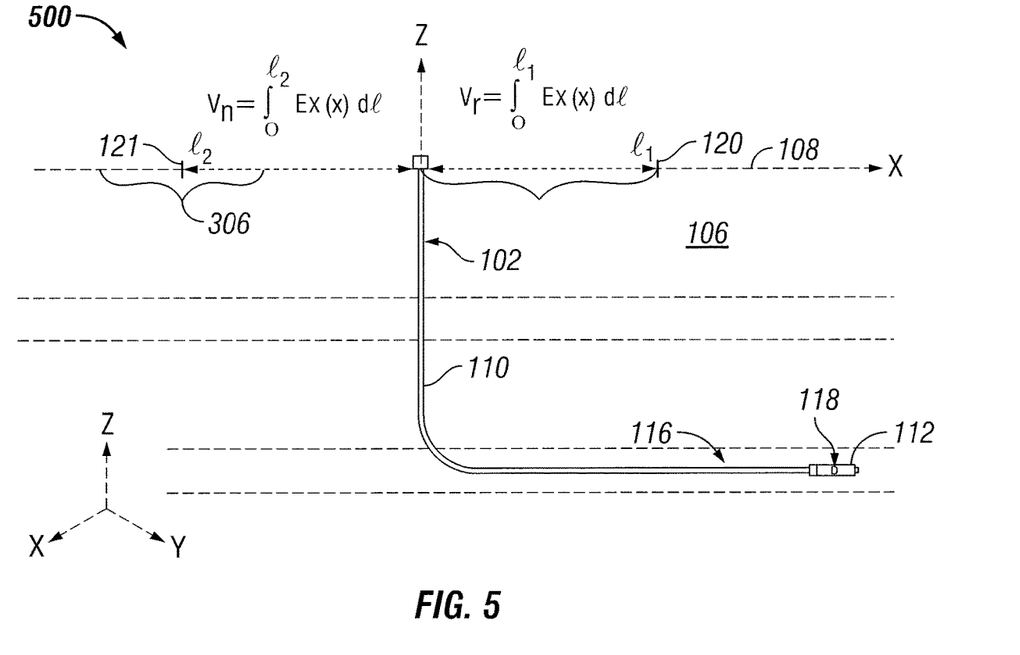
FIG. 5 is a schematic illustration of an example showing counter electrodes positioned at a surface of a subterranean formation.

FIG. 5 illustrates another example of an EM telemetry system 200 that includes second counter electrode 121 for measurement of electric fields in the null zone 306. As illustrated, first counter electrode 120 and second counter electrode 121 may be positioned at surface 108. First counter electrode 120 may be placed at surface on the side of horizontal section 304. Second counter electrode 121 may be placed at surface on an opposite size of horizontal section from horizontal section, for example, in null zone 306. The received (r) voltage at first counter electrode 120 may be calculated (via information handling system 126 and/or downhole information handling system 128, shown on FIG. 1) as the line integral 502 of the electric field at the surface 108 between the wellhead 104 and the first counter electrode 120 at $l_1$. The received noise (n) voltage at second counter electrode 121 may be calculated (via information handling system 126 and/or downhole information handling system 128, shown on FIG. 1) as the line integral of the electric field at the surface 108 between the wellhead 104 and the second counter electrode 121 at $l_2$. The distance between first counter electrode 120 and wellhead 104 may be the same or different than the distance between second counter electrode 121 and wellhead 104. $l_1$ and $l_2$ may be about 1 foot (0.3 m) to about 500 feet (152 m) (e.g., 200 ft (61 m)).

Figure 6:
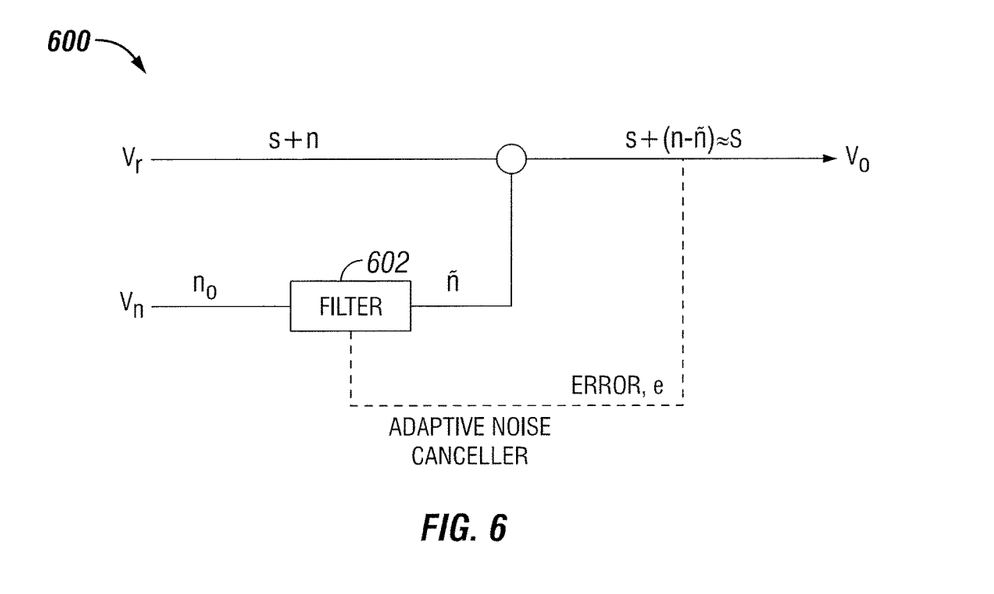
FIG. 6 is a schematic illustration of an example noise cancellation system.

FIG. 6 illustrates a schematic of a real-time (active) noise cancellation scheme 600 which may be executed with information handling system 126 and/or downhole information handling system 128, shown on FIG. 1. The received voltage $V_r$ may contain a signal s and noise n; the latter which may be correlated to the noise voltage $V_n$, which (primarily) may contain a noise signal $n_0$. The received voltage $V_r$ may be obtained, for example, at first counter electrode 120 as the line integral between the wellhead 104 and the first counter electrode 120, as shown on FIG. 5. The noise voltage $V_n$ which (primarily) may contain a noise signal $n_0$. n and $n_0$ may be correlated; and both may be uncorrelated to the signal s. The noise voltage $V_n$ may be obtained, for example, at second counter electrode 121 as the line integral between the wellhead 104 and the second counter electrode 121, as shown on FIG. 5. The noise signal no may be passed through a filter 602 such that the noise n may be removed from the received voltage $V_r$. Filter 602 may include, but is not limited to, adaptive noise cancellers. The output voltage $V_o$ (e.g., filtered voltage) may be (effectively) the signal s only or at least have an improved signal to noise ratio over $V_r$. $V_o$ may be outputted to a video display for viewing and/or further analysis. A feedback circuit may be included to dynamically adjust the filter 602 to minimize residual noise in the output voltage $V_o$.

FIG. 7 illustrates another example environment 700 for use of electromagnetic tool 112. As illustrated, wellbore 102 may extend from wellhead 104 into subterranean formation 106 from a surface 108. Wellbore 102 may include horizontal (e.g., horizontal section 304), vertical, slanted, curved, and other types of wellbore geometries and orientations.

Electromagnetic tool 112 may be tethered to vehicle 704 through conveyance 110. Conveyance 110 may be disposed around one or more sheave wheels 708. Derrick 710 may include a load cell (not shown) which determines the amount of pull on conveyance 110 at surface 108. Information handling system 712 may control a safety valve (not illustrated) which controls the hydraulic pressure that drives drum 714 on vehicle 704, which may reel up and/or release conveyance 110 which may move electromagnetic tool 112 up and/or down. The safety valve may be adjusted to a pressure such that sheave wheel 708 may only impart a small amount of tension to conveyance 110 and/or over and above the tension necessary to retrieve conveyance 110 and/or electromagnetic tool 112. The safety valve is typically set a few hundred pounds above the amount of desired safe pull on conveyance 110 such that once that limit is exceeded, further pull on conveyance 110 may be prevented.

Conveyance 110 may include wireline, slickline, coiled tubing, pipe, drill pipe, downhole tractor, or the like, which may provide mechanical suspension for electromagnetic tool 112. Conveyance 110 may also provide electrical connectivity to electromagnetic tool 112. Where it may provide electrical connectivity, conveyance 110 may include an inner core of a plurality of electrical conductors covered by an insulating wrap. An inner and outer steel armor sheath may be disposed around the conductors. The electrical conductors may be used for communicating power and telemetry between vehicle 704 (or other equipment) and electromagnetic tool 112. A downhole tractor 716 may be utilized to move electromagnetic tool 112 through high angle (e.g., about 60° to about 120° relative to vertical) and horizontal wells (e.g., horizontal section 304).

The systems and methods disclosed herein may include modern schemes for modulation and demodulation, which may include Pulse Width Modulation ("PWM"); Pulse Position Modulation ("PPM"); On-Off Keying ("OOK"); Amplitude Modulation ("AM"); Frequency Modulation ("FM"); Single-Side-Band Modulation("SSB"); Frequency Shift Keying ("FSK"); Phase Shift Keying ("FSK") such as Binary Phase Shift Keying ("BPSK") and M-ary shift keying; Discrete Multi-Tone ("DMT"); Orthogonal Frequency Division Multiplexing ("OFDM"); or combinations thereof.

The systems and methods of the present disclosure may be utilized with or without remote referenced telluric cancellation and may be deployed in onshore or offshore drilling environments. Further, the systems and methods of the present disclosure may not utilize dual input noise cancellation techniques to remove rig noise.

The systems and methods may include any of the various features of the systems and methods disclosed herein, including one or more of the following statements.

Statement 1. A method for noise cancellation in electromagnetic telemetry including: disposing an electromagnetic tool in a lateral section of a wellbore, wherein the electromagnetic tool includes a transmitter; positioning a first counter electrode at a surface of the Earth; positioning a second counter electrode at the surface on an opposite side of the wellbore from the lateral section; transmitting a signal from the electromagnetic tool; measuring a first electromagnetic field property using the first counter electrode to obtain a received voltage; measuring a second electromagnetic field property using the second counter electrode to obtain a noise voltage; and removing noise from received voltage using the noise voltage.

Statement 2. The method of statement 1, wherein the second counter electrode is positioned at about 90° to about 270° from the first counter electrode in an x-y plane.

Statement 3. The method of statement 1 or statement 2, wherein the received voltage is a first line integral of an electric field between a wellhead of the wellbore and the first counter electrode.

Statement 4. The method of any previous statement, wherein determining the noise voltage is a second line integral of an electric field between a wellhead of the wellbore and the second counter electrode.

Statement 5. The method of any previous statement, wherein the first counter electrode and the second counter electrode each include a capacitive electrode, galvanic electrode, or a combination thereof.

Statement 6. The method of any previous statement, wherein the second counter electrode is positioned in a null zone, wherein signals from the transmitter in the lateral section are minimized.

Statement 7. The method of any previous statement, wherein the transmitting a signal includes transmitting the signal from the transmitter at frequencies between about 1 Hz and about 50 Hz.

Statement 8. The method of any previous statement, wherein the first counter electrode is positioned above the lateral section at no more than 10° from vertical.

Statement 9. The method of any previous statement, wherein the transmitter includes a voltage source including a voltage from about 1 volt to about 100 volts.

Statement 10. The method of any previous statement, wherein the removing noise from the received voltage using the noise voltage includes passing the noise voltage through a filter to approximate the noise and then removing the noise from the received voltage.

Statement 11. The method of statement 10, wherein a feedback circuit is used to dynamically adjust the filter to minimize residual noise in output voltage from the filter.

Statement 12. A method for noise cancellation in electromagnetic telemetry including: disposing an electromagnetic tool in a horizontal section of a wellbore, wherein the electromagnetic tool includes a voltage source; positioning a first counter electrode above the horizontal section at a surface of the Earth; positioning a second counter electrode on an opposite side of the wellbore from the first counter electrode, the second counter electrode being positioned at about 90° to about 270° from the first counter electrode in an x-y plane; transmitting a signal from the electromagnetic tool; determining a received voltage at the first counter electrode; determining a noise voltage at the second counter electrode; and removing noise from received voltage using the noise voltage.

Statement 13. The method of statement 12, wherein the received voltage is a first line integral of an electric field between a wellhead of the wellbore and the first counter electrode, and wherein the noise voltage is a second line integral of an electric field between the wellhead of the wellbore and the second counter electrode.

Statement 14. The method of statement 12 or statement 13, wherein the transmitting a signal includes transmitting the signal from the voltage source at frequencies between about 1 Hz and about 50 Hz, and wherein the voltage source includes a voltage from about 1 volt to about 100 volts.

Statement 15. The method of any one of statements 12 to 14, wherein the removing noise from the received voltage using the noise voltage includes passing the noise voltage through a filter to approximate the noise and then removing the noise from the received voltage.

Statement 16. An electromagnetic telemetry system including: an electromagnetic tool including a transmitter for transmitting a signal from a lateral section of wellbore; a first counter electrode positioned at a surface of the Earth above the lateral section of the wellbore for measuring a first electromagnetic field property to obtain a received voltage; a second counter electrode positioned at the surface of the Earth on an opposite side of the wellbore from the first counter electrode for measuring a second electromagnetic field property to obtain a noise voltage; and an information handling system operable to remove noise from the received voltage using the noise voltage.

Statement 17. The electromagnetic telemetry system of statement 16, wherein each of the first counter electrode and the second counter electrode includes a capacitive electrode, galvanic electrode, or a combination thereof.

Statement 18. The electromagnetic telemetry system of statement 16 or statement 17, wherein the transmitter is configured to transmit the signal at frequencies between about 1 Hz and about 50 Hz, and includes a voltage source of about 1 volt to about 100 volts.

Statement 19. The electromagnetic telemetry system of any one of statements 16 to 18, wherein the second counter electrode is positioned at about 90° to about 270° from the first counter electrode in an x-y plane, and wherein the first counter electrode is positioned above the lateral section at no more than 10° from vertical.

Statement 20. The electromagnetic telemetry system of any one of statements 16 to 19, wherein the information handling system is operable to removed noise from the received voltage using the noise voltage by passing the noise voltage through a filter to approximate the noise and then removing the noise from the received voltage.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the systems and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for noise cancellation in electromagnetic telemetry comprising:
   disposing an electromagnetic tool in a lateral section of a wellbore, wherein the electromagnetic tool comprises a transmitter;
   positioning a first counter electrode at a surface of the Earth;
   positioning a second counter electrode at the surface on an opposite side of the wellbore from the lateral section;
   transmitting a signal from the electromagnetic tool;
   measuring a first electromagnetic field property using the first counter electrode to obtain a non-filtered received voltage;
   measuring a second electromagnetic field property using the second counter electrode to obtain a noise voltage;
   inputting the noise voltage into a filter and dynamically adjusting the filter in real time to form an approximate noise as an output of the filter; and
   removing noise from the non-filtered received voltage using the approximate noise.

2. The method of claim 1, wherein the second counter electrode is positioned in a zone between 90° and 270° from the first counter electrode in an x-y plane.

3. The method of claim 1, wherein the non-filtered received voltage is a first line integral of an electric field between a wellhead of the wellbore and the first counter electrode.

4. The method of claim 1, wherein determining the noise voltage is a second line integral of an electric field between a wellhead of the wellbore and the second counter electrode.

5. The method of claim 1, wherein the first counter electrode and the second counter electrode each comprise a capacitive electrode, galvanic electrode, or a combination thereof.

6. The method of claim 1, wherein the second counter electrode is positioned in a null zone, wherein signals from the transmitter in the lateral section are minimized.

7. The method of claim 1, wherein the transmitting a signal comprises transmitting the signal from the transmitter at frequencies between 1 Hz and 50 Hz.

8. The method of claim 1, wherein the first counter electrode is positioned above the lateral section at no more than 10° from vertical.

9. The method of claim 1, wherein the transmitter comprises a voltage source comprising a voltage between 1 volt and 100 volts.

10. The method of claim 1, wherein dynamically adjusting the filter is performed by a feedback loop.

11. The method of claim 1, wherein the first electrode is positioned to measure a maximum electric field.

12. A method for noise cancellation in electromagnetic telemetry comprising:
    disposing an electromagnetic tool in a horizontal section of a wellbore, wherein the electromagnetic tool comprises a voltage source;
    positioning a first counter electrode above the horizontal section at a surface of the Earth;
    positioning a second counter electrode on an opposite side of the wellbore from the first counter electrode, the second counter electrode being positioned in a zone between 90° and 270° from the first counter electrode in an x-y plane;
    transmitting a signal from the electromagnetic tool;
    determining a non-filtered received voltage at the first counter electrode;
    determining a noise voltage at the second counter electrode;
    inputting the noise voltage into a filter and dynamically adjusting the filter in real time to form an approximate noise as an output of the filter; and
    removing noise from the non-filtered received voltage using the approximate noise.

13. The method of claim 12, wherein the non-filtered received voltage is a first line integral of an electric field between a wellhead of the wellbore and the first counter electrode, and wherein the noise voltage is a second line integral of an electric field between the wellhead of the wellbore and the second counter electrode.

14. The method of claim 12, wherein the transmitting a signal comprises transmitting the signal from the voltage source at frequencies between 1 Hz and 50 Hz, and wherein the voltage source comprises a voltage between 1 volt and 100 volts.

15. The method of claim 12, wherein the first counter electrode is positioned above the lateral section at no more than 10° from vertical and measures a maximum electric field.

16. An electromagnetic telemetry system comprising:
   an electromagnetic tool comprising a transmitter for transmitting a signal from a lateral section of wellbore;
   a first counter electrode positioned at a surface of the Earth above the lateral section of the wellbore for measuring a first electromagnetic field property to obtain a non-filtered received voltage;
   a second counter electrode positioned at the surface of the Earth on an opposite side of the wellbore from the first counter electrode for measuring a second electromagnetic field property to obtain a noise voltage;
   a filter that receives the noise as an input, is dynamically adjusted in real time, and forms an approximate noise as an output; and
   an information handling system operable to remove noise from the non-filtered received voltage using the approximate noise.

17. The electromagnetic telemetry system of claim 16, wherein each of the first counter electrode and the second counter electrode comprises a capacitive electrode, galvanic electrode, or a combination thereof.

18. The electromagnetic telemetry system of claim 16, wherein the transmitter is configured to transmit the signal at frequencies between 1 Hz and 50 Hz, and comprises a voltage source between 1 volt and 100 volts.

19. The electromagnetic telemetry system of claim 16, wherein the second counter electrode is positioned in a zone between 90° and 270° from the first counter electrode in an x-y plane, and wherein the first counter electrode is positioned above the lateral section at no more than 10° from vertical.

20. The system of claim 16, wherein the first electrode is positioned to measure a maximum electric field.

* * * * *